G. A. PARMENTER.
CAR FENDER.
APPLICATION FILED JUNE 16, 1908. RENEWED JUNE 3, 1909.

945,727.

Patented Jan. 4, 1910.

Attest:
Bent. M. Stahl.
Edward N. Sarton.

Inventor.
George A. Parmenter
By Shear Middleton Donaldson Shear
Atty's.

UNITED STATES PATENT OFFICE.

GEORGE A. PARMENTER, OF BOSTON, MASSACHUSETTS.

CAR-FENDER.

945,727.  Specification of Letters Patent.  Patented Jan. 4, 1910.

Application filed June 16, 1908, Serial No. 438,853. Renewed June 3, 1909. Serial No. 499,995.

*To all whom it may concern:*

Be it known that I, GEORGE A. PARMENTER, a citizen of the United States, residing at Boston, Massachusetts, have invented certain new and useful Improvements in Car-Fenders, of which the following is a specification.

My present invention relates to improvements in fenders or guards for railway cars of the type known as trip and drop scoop. In a co-pending application filed by me on the 15th day of May, 1908, #433111, I have shown a fender of this type applied to a radial truck car with the scoop carried by the truck and the trip device carried by the car body.

In the present application, I have shown a construction in which both the scoop and trip frame could be carried wholly by the truck, having in view in devising this the cheapening of the construction and the facilitating of the application to and removal from the car.

I have also aimed to provide a fender in which the tripping device will be yieldingly or resiliently supported so as to obviate the detrimental effects due to the pounding of the wheels on rail joints and irregularities on the track.

With these and other objects in view, the invention includes the novel features of construction and arrangement and combination of parts hereinafter described and particularly pointed out in the appended claims.

An embodiment of the invention is illustrated in the accompanying drawing, in which,—

Figure 1:
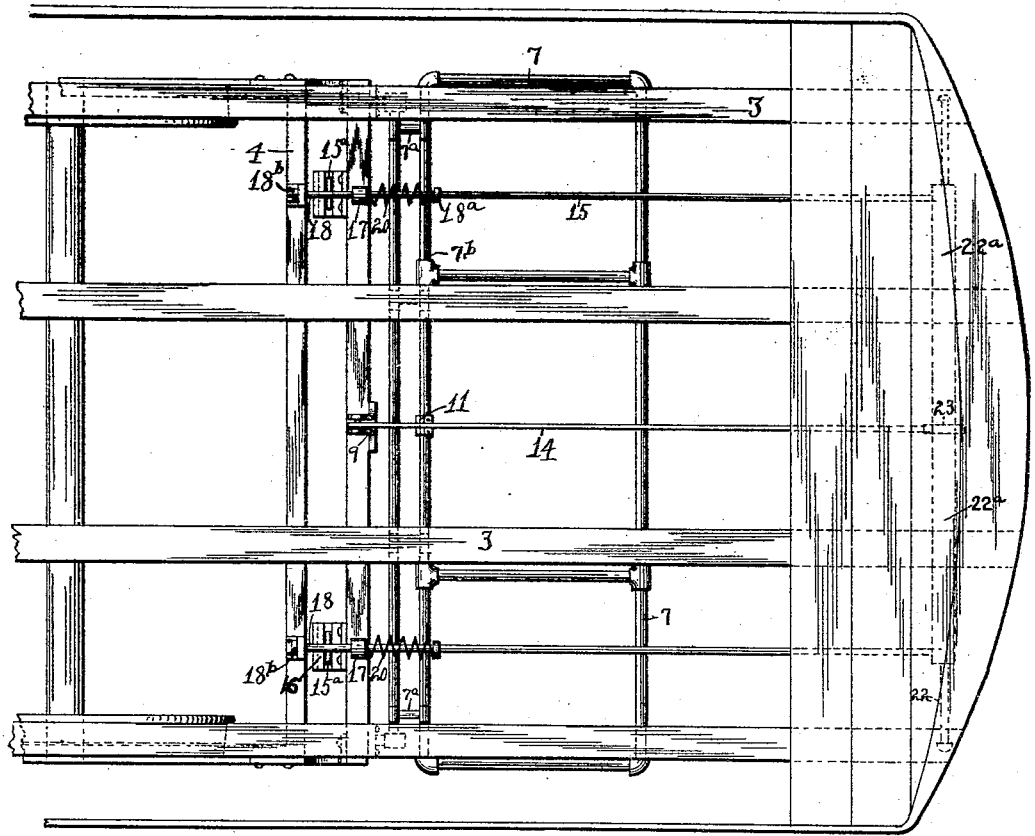
Figure 2:
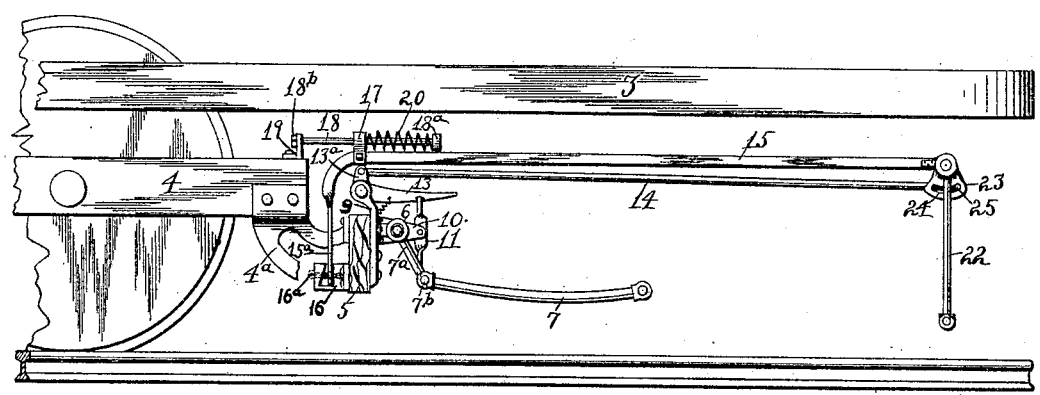

Figure 1 is a plan view, Fig. 2 is a side elevation, a sufficient portion of the truck and sills of the car body being shown to illustrate the application of the improved fender thereto.

Referring by reference characters to this drawing, the numerals 3—3 designate the sills of the car body and 4 the truck frame. The usual front cross bar is shown at 5, which is secured to the front end of the truck frame by the brackets 4ª. To the front face of the cross bar are secured brackets 6 by which the rear portion 7ª of the scoop or fender 7 is pivotally supported. A bracket 9 is bolted to the front side of the cross bar 5 and has a projecting portion 10, in which is pivotally mounted a lever 11, the lower end of which engages with the rear cross bar 7ᵇ of the fender, while its upper end engages a notch in a latch lever by which the fender or scoop is held in an elevated position. The lever 11 is preferably formed of a bar of spring metal having a central portion twisted or bent into a plane at right angles to the plane of the upper and lower portions, whereby the said upper and lower portions are made elastic or yielding to a certain extent and thus the detrimental effect of shocks upon the fender due to the passage of the wheels over the rail joints and the like is avoided. The latch lever which engages the upper end of the lever 11 is indicated at 13 and is in the form of a bell crank lever pivoted to the upper end of the bracket 9. The arm 13ª of this bell crank lever is connected by a link 14 with the trip frame 22 so that when the trip frame is swung rearwardly the latch lever will be lifted and the scoop released.

In order to support the trip frame 22 so as to avoid the detrimental effects due to the passage of the wheels over rail joints and inequalities in the track, I support this from the truck frame in the following manner. On each side of the car is located a horizontal bar 15, preferably set edgewise and having a downwardly turned rear end, the lower portion of which is bent into a plane at right angles to the remaining portion as indicated at 15ª, and has its end confined in a recess in a block or bracket 16 by a pin 16ª. An eye 17 is secured to each rod or bar 15 near the bend, through which passes a bolt or rod 18, which has one end secured to the lug or bracket 19 on the truck frame, the other end of the rod 18 being provided with a head, as indicated at 18ª, between which and the lug or bracket 17 is located a helical spring 20, which by its pressure on the lug 17 tends to keep the corresponding rod 15 raised in horizontal position. The tension of the spring may be adjusted by the nut 18ᵇ so as to bring the rod or bar 15 into the proper position. The trip frame 22 is pivotally supported from the cross bar 22ª carried by the forward ends of these rods, a segment plate 23 being attached to this cross bar having an arc shaped slot 24, in the front end of which the pin 25 connecting the rod 14, normally rests.

From the foregoing description it will be seen that I provide a fender in which the scoop and tripping mechanism are all carried by the truck and are therefore unaffected by the vertical swinging movements of the car body. At the same time, owing to the provision of the spring connection 11 between the scoop and the latch lever and the spring 20 supporting the resiliently suspended rods 15, which support the trip frame, and also because of the elasticity afforded by the angularly turned parts $15^a$, the whole mechanism is rendered capable of yielding to shocks due to the passage of the wheels over rail joints or inequalities or obstacles upon the track. Thus the device is rendered more durable and more efficient in action. Where a fender of this type is used on a single truck car it is entirely unaffected by the vertical movements of the car body which in a car of this type are very marked.

Having thus described my invention, what I claim is:—

1. The combination with a truck frame, of resilient supporting means carried by the truck frame and extending forward therefrom, a trip frame suspended from the said resilient means, a scoop carried by the truck frame, and operating connections between the trip frame and scoop, substantially as described.

2. In combination with a car truck, a pair of resilient, supported rods projecting forwardly therefrom, a trip frame suspended from the forward ends of the said rods, a scoop carried by the truck frame, a resilient lever for suspending said scoop in its elevated position, a latch lever engaging said resilient lever, and operating connections between said latch lever and trip frame, substantially as described.

3. In combination with a truck frame, brackets carried thereby, a pair of rods or bars having downwardly curved rear ends supported by said brackets, spring tension means interposed between the truck frame and the upper portion of said rods, a scoop carried by the truck frame, a trip frame suspended from the forward ends of said rods and operating connections between the trip frame and scoop, substantially as described.

4. In combination, a truck frame having a front cross bar, a scoop pivotally supported from said cross bar, a pair of rods having downwardly curved rear ends pivotally supported from said cross bar, eyes carried by said rods, headed bolts or rods passing through said eyes and having their rear ends adjustably connected with lugs on the truck frame, springs encircling said rods between the eyes and heads, a trip frame supported upon the forward end of the rods, and operating connections between the trip frame and scoop, substantially as described.

In testimony whereof, I affix my signature in presence of two witnesses.

GEORGE A. PARMENTER.

Witnesses:
FRED O. LITTLE,
HARRISON W. PEARL.